United States Patent [19]

Grasselli et al.

[11] Patent Number: 4,923,770
[45] Date of Patent: May 8, 1990

[54] AMORPHOUS METAL ALLOY COMPOSITIONS FOR REVERSIBLE HYDROGEN STORAGE AND ELECTRODES MADE THEREFROM

[75] Inventors: Robert K. Grasselli, Aurora; Jonathan H. Harris, Shaker Heights; Richard S. Henderson; Michael A. Tenhover, both of Solon, all of Ohio

[73] Assignee: The Standard Oil Company, Cleveland, Ohio

[21] Appl. No.: 243,109

[22] Filed: Sep. 2, 1988

Related U.S. Application Data

[63] Continuation of Ser. No. 53,772, May 26, 1987, abandoned, which is a continuation-in-part of Ser. No. 717,429, Mar. 29, 1985, abandoned, which is a continuation-in-part of Ser. No. 717,430, Mar. 29, 1985, abandoned, which is a continuation-in-part of Ser. No. 915,962, Oct. 6, 1986, abandoned.

[51] Int. Cl.$^5$ .................... H01M 4/36; H01M 6/24
[52] U.S. Cl. .................... 429/101; 429/209; 420/900
[58] Field of Search .................... 429/101, 209, 218; 420/900

[56] References Cited

U.S. PATENT DOCUMENTS

| | | | |
|---|---|---|---|
| 3,288,641 | 11/1966 | Rightmire | 429/200 |
| 4,057,679 | 11/1977 | Dey | 429/194 |
| 4,551,400 | 11/1985 | Sapru et al. | 420/900 |
| 4,605,603 | 8/1986 | Kanda et al. | 429/57 |
| 4,621,034 | 11/1986 | Kanda et al. | 429/59 |
| 4,623,597 | 11/1986 | Sapru et al. | 429/101 |
| 4,637,967 | 1/1987 | Keem et al. | 429/101 |

FOREIGN PATENT DOCUMENTS 3147604 12/1978 Japan.
6044728 4/1981 Japan.

OTHER PUBLICATIONS

Ivey et al., Metal Hydrides for Energy Storage, J. Materials for Energy Systems, vol. 3, No. 3, Dec. 1981, pp. 3–19.

*Primary Examiner*—Donald L. Walton
*Attorney, Agent, or Firm*—Larry W. Evans; Joseph G. Curatolo; Sue E. Phillips

[57] ABSTRACT

The present invention provides a novel amorphous metal alloy composition which reversibly stores hydrogen and is useful as the hydrogen storage electrode in an energy storage device. The amorphous metal alloy is made up of at least three elements with at least one element of Ag, Hg, or Pt; at least one element of Pb, Cu, Cr, Mo, W, Ni, Al, Co, Fe, Zn, Cd, Ru or Mn: and at least one element of Ca, Mg, Ti, Zr, Hf, Nb, V or Ta.

32 Claims, 3 Drawing Sheets

AMORPHOUS METAL ALLOY COMPOSITIONS FOR REVERSIBLE HYDROGEN STORAGE AND ELECTRODES MADE THEREFROM

CROSS-REFERENCES RELATED APPLICATIONS

This is a continuation of co-pending application Ser. No. 053,772 filed on May 26, 1987 which is a continuation-in-part of application Ser. Nos. 717,429 filed Mar. 29, 1985; 717,430 filed Mar. 29, 1985; and 915,962 Filed Oct. 6, 1986, all now abandoned.

FIELD OF THE INVENTION

The present invention relates to novel amorphous metal alloy compositions, and electrodes made therefrom, capable of reversible hydrogen storage. These compositions and electrodes, as well as electrical energy storage devices using the electrodes, are capable of cyclically storing and releasing relatively large quantities of hydrogen without becoming corroded or inactivated by oxidation.

BACKGROUND OF THE INVENTION

Shortages of fossil fuel materials in the recent past has spurred much speculation regarding the feasibility of economies based on other energy sources. One such scenario is a hydrogen-fueled economy. Hydrogen has the highest energy density per unit weight of any chemical. Many projections have been made for an economy based on this element, but the technology is not yet in place to effect such a dramatic change in the world economy. Hydrogen is, however, a technically attractive source of fuel and energy storage. It is essentially non-polluting, the major byproduct of combustion being $H_2O$, and can be made from readily available and abundant raw materials.

While it is well known that hydrogen can be stored as a compressed gas or cryogenically as a liquid, other less energy-intensive and more convenient means are required for widespread utilization of hydrogen as a source of stored energy.

It is known that some metals and metal alloys are capable of storing hydrogen reversibly within their lattice. This characteristic may be exploited by exposing the metal or metal alloy to a large pressure of hydrogen, impregnating the metal or metal alloy with hydrogen and later recovering the stored hydrogen or subjecting the impregnated metal or alloy to a change in temperature or pressure. One example of a metal that is capable of reversible hydrogen storage is palladium which can absorb up to 0.6 hydrogen atoms for every palladium atom. For an example of reversible hydrogen storage alloys, see, R. L. Cohen and J. H. Wernick, "Hydrogen Storage Materials: Properties and Possibilities", Science, Dec. 4, 1981, Vol. 214, No. 4526, pg. 1081, which reported on the ability of alloys such as $LaNi_5$ to absorb hydrogen in the gas phase.

This characteristic of reversible hydrogen storage for $LaNi_5$-type alloys was reported as also being applicable in an electrochemical environment by Bronoel et al., "A New Hydrogen Storage Electrode", International Journal of Hydrogen Energy, Vol. 1, pp. 251-254, 1976. A metal or metal alloy suitable as a hydrogen storage material may be cathodically biased relative to a suitable counter electrode and charged with hydrogen by the reduction of a proton from solution. Other metal alloy systems that have been studied included TiMn-based, FeTi-based and Mg-based alloys. Although some of these crystalline materials store appreciable quantities of hydrogen, these same crystalline materials are susceptible to phase separation, hydrogen embrittlement and surface oxidation when subjected to repeated charge/discharge cycles for hydrogen storage. Phase separation occurs in crystalline alloys that are subjected to hydrogen cycling, wherein the alloy components separate and migrate throughout the alloy. In $LaNi_5$-type alloys, La migrates to the surface of the alloy, where it may rapidly become oxidized.

This problem was recently adddressed in Japanese Publication 58, 163,157 entitled "Metal Oxide-Hydrogen Battery". This publication describes a hydrogen storage battery having an improved $LaNi_5$ anode that is less susceptible to oxidation. This improvement comes from the use of a porous nickel layer disposed around the $LaNi_5$ anode to reduce oxidation.

Hydrogen embrittlement occurs in crystalline alloys as hydrogen is absorbed and desorbed. Hydrogen storage proceeds from the surface of the alloy to its interior, with hydrogen atoms breaking into the interstitial site of metal matrix atoms and thus expanding the lattice. As a result, internal stresses may produce flaws and cracks, seriously weakening and embrittling the metal or metal alloy. Surface oxidation may occur if the hydrogen storage material is exposed to oxidative conditions in the presence of an oxidant such as $CO_2$, $H_2O$, KOH, air, oxygen, or an oxidizing acidic environment. Surface oxidation interferes with the penetration of hydrogen, reducing the amount of hydrogen absorbed and the rate of absorption. Additionally, these crystalline materials generally cannot withstand corrosive environments, which environments may exist when the materials are utilized in an electrochemical reaction. An analysis of the TiMn alloy system, and its attendant drawbacks, is provided in Yayama, et al., "Electrochemical Hydrogen-Storage in Ti-Mn Alloy Electrodes", Japanese Journal of Applied Physics, Vol. 22, No. 10, pp. 621-623, Oct. 1983.

Recently, amorphous metal alloy materials have been reported as having the ability to store hydrogen reversibly. Amorphous metal alloy materials have become of interest due to their unique combinations of mechanical, chemical and electrical properties. Amorphous metal materials have compositionally variable properties including high hardness and strength, flexibility, soft magnetic and ferroelectric properties, very high resistance to corrosion and water, unusual alloy compositions, and high resistance to radiation damage. The unique combinations of properties possessed by amorphous metal alloy materials may be attributed to the disordered atomic structure of amorphous materials that insures that the material is chemically homogeneous and free from the extended defects that are known to limit the performance of crystalline materials.

A general discussion of hydrogen absorption by amorphous or glassy metal alloys was provided by G. G. Libowitz and A. J. Maeland, "Interactions of Hydrogen with Metallic Glass Alloys38 Journal of the Less-Common Metals, 101, pp. 131-43, 1984.

Schroeder and Koster studied hydrogen embrittlement in Fe-Ni-B, Pd-Zr amorphous alloy ribbons, "Hydrogen Embrittlement of Metallic Glasses", Journal of Non-Crystalline Solids, 56, pp. 213-218, 1983. Whereas Fe-Ni-B alloys exhibited low hydrogen absorption and severe embrittlement, Pd-Zr and Ni-Zr alloys could absorb up to one atom of hydrogen per metal atom and still retain some ductility.

Amorphous metal alloy systems of TiCu and ZrCu were investigated and contrasted with the absorption properties of the corresponding crystalline intermetallic compounds by Maeland, et al., "Hydrides of Metallic Glass Alloys," Journal of the Less-Common Metals, 74, pp. 279-285, 1980. Amorphous metal alloy compositions, under similar conditions of temperature and pressure were capable of absorbing larger amounts of hydrogen than their crystalline counterparts. Maeland, et al. restricted their studies to the gaseous absorption of hydrogen in a hydrogen atmosphere. The amorphous compositions are not expected to suffer from phase separation or to become embrittled, due to their unique structure. However, these materials may not show substantial resistance to surface passivation by oxidation or to corrosion. Maeland, et al., by excluding oxygen in their system, and by working in a gaseous environment, have avoided addressing the effects of oxidation and harsh environments on the hydrogen storage amorphous metal alloys that were investigated.

A patent publication in the United Kingdom, GB 2 119 561 A, to Energy Conversion Devices, Inc., describes a battery utilizing a hydrogen rechargeable anode that is an amorphous metal material. This publication examined Ti-Ni and Mg-Ni compositions as hydrogen storage anodes.

U.S. Pat. No. 4,637,967, also to Energy Conversion Devices, Inc., discloses an amorphous metal electrode, composed of Ni, Ti and a third element selected from a large group of elements, usable in energy storage devices to store hydrogen.

The work recited hereinabove is an indication of the interest that lies in the field of energy storage through the use of reversible hydrogen storage materials. However, the ability to store hydrogen is not alone sufficient to yield a useful material having widespread applications. The stability of such a material is also of paramount importance. Resistance to corrosion and oxidation must exist for continuous full-cycling of these materials. It is noted that the hydrogen batteries described in Japanese Publication 58,163,157 and U.K. Publication GB 2119561 A are never fully discharged during cycling, the fully discharged materials being sensitive to oxidation, and thus, to failure.

Thus it is seen that the potential exists for significant new technological advances in the application of amorphous metal alloys to the development of hydrogen as a fuel and a source of stored energy, especially in the area of electrochemical reversible hydrogen storage. What is needed in this area are amorphous metal alloy compositions having the ability to reversibly store hydrogen in significant quantities. Such amorphous metal alloys should not suffer from phase separation or hydrogen-caused embrittlement, nor be susceptible to surface oxidation or corrosion. Further, what is needed in the field of reversible hydrogen storage for energy storage devices is an electrode, operable in an alkaline or acidic environment, that can reversibly store hydrogen and undergo deep cyclic discharges without becoming unstable or detrimentally affected by corrosion or oxidation.

It is therefore one object of the present invention to provide amorphous metal alloy compositions and electrodes made therefrom capable of reversibly storing hydrogen.

It is an additional object of the present invention to provide amorphous metal alloy compositions capable of reversibly storing hydrogen in a cyclical fashion without becoming embrittled or suffering from a phase separation.

It is another object of the present invention to provide amorphous metal alloy compositions and electrodes made therefrom capable of reversibly storing hydrogen in a cyclical manner that are not impaired by surface oxidation or corrosion.

It is yet another object of the present invention to provide a hydrogen storage electrode that can be used cyclically through deep discharge cycles, and in an energy storage device that can cyclically be charged to high energy densities and deeply discharged.

These and other objects of the present invention will become apparent to those skilled in the art from the description that follows and the appended claims.

SUMMARY OF THE INVENTION

The present invention is directed toward a reversible hydrogen storage material comprising an amorphous metal alloy of the formula:

$$A_a M_b M'_c \qquad (I)$$

wherein
A is at least one metal selected from the group consisting of Ag, Hg, Pd and Pt;
M is at least one metal selected from the group consisting of Pb, Cu, Cr, Mo, W, Ni, Al, Co, Fe, Zn, Cd, Ru and Mn; and
M' is at least one metal selected from the group consisting of Ca, Mg, Ti, Zr, Hf, Nb, V and Ta; and
wherein
a ranges from about 0.005 to about 0.80;
b ranges from about 0.05 to about 0.70; and
c ranges from about 0 08 to about 0.95.

The present invention is further directed toward an electrode for reversibly storing hydrogen comprising an amorphous metal alloy of the formula:

$$A_a M_b M'_c$$

wherein the components and proportions are as recited in formula I above.

The invention also relates to an energy storage device comprising a working electrode, a counter electrode electrically isolated from the working electrode, an electrolyte in contact with the working electrode and the counter electrode, and means for collecting electrical current therefrom, the working electrode comprising an amorphous metal alloy of the formula $$A_a M_b M'_c \qquad (I)$$

wherein the components and proportions are as recited in formula I above.

BRIEF DESCRIPTION OF THE DRAWINGS

The invention is more fully described herein below and with reference to the accompanying Figures wherein.

DETAILED DESCRIPTION OF THE INVENTION

Figure 1:
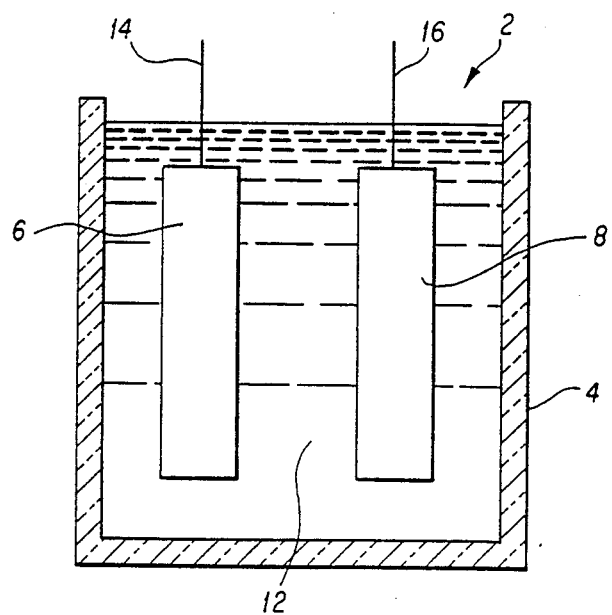
FIG. 1 is a schematic representation of an energy storage device in accordance with the present invention.

The compositions described herein are substantially amorphous metal alloys. The term "substantially" as used herein in reference to the amorphous metal alloys indicates that the metal alloys are at least fifty percent amorphous, as indicated by x-ray diffraction analysis. Preferably, the metal alloy is at least eighty percent amorphous, and most preferably about one hundred percent amorphous, as indicated by x-ray diffraction analysis. The use of the phrase 'amorphous metal alloy' herein refers to amorphous metal-containing alloys that may also comprise non-metallic elements.

In accordance with the present invention there are provided amorphous metal alloy compositions, and electrodes made therefrom, having the ability to reversibly store hydrogen. These amorphous metal alloys are represented by empirical formula I:

$$A_aM_bM'_c$$

wherein
A is at least one element selected from the group consisting of Ag, Hg, Pd and Pt;
M is at least one metal selected from the group consisting of Pb, Cu, Cr, Mo, W, Ni, Al, Co, Fe, Zn, Cd, Ru and Mn;
M' is at least one element selected from the group consisting of Ca, Mg, Ti, Zr, Hf, Nb, V and Ta; and
wherein
a ranges from about 0.005 to about 0.80;
b ranges from about 0.05 to about 0.70; and
c ranges from about 0.08 to about 0.95.

If only hydrogen storage ability is considered, then preferably, A is Pt, Pd or combinations thereof, and M is an element selected from the group consisting of Mn, Ru, Fe, Cu, Co, Ni, Cr, Mo, Al, W and combinations thereof. Most preferably, M is an element selected from the group consisting of Ni, Co, Mn, and combinations thereof, and M' is Zr, Ti, Ca, Mg or a combination thereof. By combinations is meant mixtures and/or alloys of the above-listed elements.

Preferably, the ranges of a, b and c are from about 0.05 to about 0.75; about 0.1 to about 0.7; and from about 0.2 to about 0.85, respectively. Most preferably, the ranges of a, b and c are from about 0.05 to about 0.1; about 0.5 to about 0.7; and from about 0.3 to about 0.8, respectively.

When the hydrogen storage composition is to be employed in an alkaline condition, that is, in an environment wherein the pH is measured to be greater than seven, then it is preferred that the M component of the composition include at least one of the elements Mo, Co, Fe, Ni and Mn, and the M' component is preferable at least one of the elements Zr, Ca and Mg. Further, in these compositions for use in alkaline environments the M component most preferably comprises at least 50% of the total composition. When the hydrogen storage composition is to be utilized in neutral or acid conditions, that is, in an environment wherein the pH is measured to be seven or less, then it is preferred that the M component of the composition include at least one of the elements Ru, Pb, Cu, Cr, W and Mo, and the M' component is preferably at least one of the elements Zr, Nb and Ti. Compositions of this invention having the formula $A_aM_bM'_c$ and wherein M includes at least one of the elements Mo, Ru, W, Cr and Ni are expected to be extremely stable in non-aqueous electrolytes and in contact with solid state proton conductors.

Amorphous hydrogen storage compositions of the present invention include Pd-Mo-Ti, Ag-W-Ti, Pd-Ni-Zr, Pt-Ni-Zr and Pd-(AlNi)-Ti. The foregoing list is not to be construed as limiting but merely exemplary. These compositions have been found to have the desirable properties of reversible hydrogen storage in combination with corrosion and oxidation resistance and stable mechanical properties.

The amorphous metal alloy compositions taught herein have the ability to reversibly store from about 0.35 to more than about 1.1 hydrogen atoms per molecule of alloy. This compares favorably to known hydrogen storage materials such as crystalline palladium which is capable of reversibly storing about 0.55 hydrogen atoms per atom of palladium.

Because the compositions in accordance with this invention are substantially amorphous, these compositions do not exhibit phase separations and are less susceptible to hydrogen embrittlement even after continuous cycling of the compositions. Compositions having the formula $A_aM_bM'_c$ have been cycled up to 500 times with no apparent degradation from phase separation.

Additionally, these compositions have been cycled in electrolytes under highly oxidative conditions with no appreciable surface passivation. This is thought to be attributable to the A component of the alloy of the instant invention. Thus, these compositions will continue to reversibly store hydrogen through many cycles without any decrease in efficiency due to surface oxidation. Surface passivation is a major cause of failure of known hydrogen storage materials. Crystalline hydrogen storage materials do not exhibit the ability to resist surface oxidation. The general class of amorphous hydrogen storage materials are also not excluded from surface passivation. The compositions taught herein, however, show no significant passivation when used to continuously store and release hydrogen in the presence of oxygen, hydroxide ion and/or water. The incorporation of an A component in the compositions herein disclosed protects these compositions from surface passivation and retains the compositions' ability to actively absorb and desorb hydrogen.

The amorphous metal alloy compositions of the present invention also demonstrate resistance to corrosion. Utilization of hydrogen storage materials in electrochemical systems may subject the material to a corrosive environment that is capable of degrading the hydrogen storage material. Examples of corrosive environments include KOH solutions as well as such acid solutions as $H_2SO_4$, $H_3PO_4$, HCl, $Na_2SO_4$, NaCl and/or acetic acid. Hence, the stability of the hydrogen storage material in an electrolyte solution may determine its potential for use in that system. The amorphous alloy compositions taught herein have been subjected to a variety of corrosive environments with no decrease in stability detected. An electrolyte solution of 2N KOH was seen to oxidize and passivate amorphous metal alloys comprising NiTi, but not to affect compositions in accordance with this invention such as Pd-Ni-Ti. Likewise, electrolyte solutions of $H_2SO_4$ and $H_3PO_4$ were seen to corrode crystalline Pd but not to affect compositions taught herein such as Pd-Mo-Ti.

These compositions may be synthesized by any of the known techniques for forming amorphous metal alloys. Thus, physical and chemical methods such as electron beam deposition, ion implantation, chemical reduction, thermal decomposition, ion cluster deposition, ion plating, rapid quenching, solid state diffusion and RF and DC sputtering may be utilized to form the compositions herein.

The presence of other elements as impurities in the amorphous metal alloy composition or in the electrodes made thereform is not expected to seriously impair the ability of the alloy to reversibly store hydrogen. Thus, trace impurities such as O, N, C, S, Se, Te, B, P, Ge, Sb, As and Ar are not expected to be seriously detrimental to the preparation and performance of these materials.

To insure the desired hydrogen storage properties of these amorphous metal alloy materials and electrodes made therefrom, it is not intended that there be exposure to an environment wherein the temperature of the alloy may reach or exceed its crystallization temperature.

As taught herein, these compositions may readily be utilized as electrodes in alkaline or acid energy storage devices. The amorphous metal alloy compositions discussed above and the electrodes made therefrom may exist separately or in conjunction with a substrate. Packed powder of the compositions herein disclosed may provide a bulk hydrogen storage means or electrode, and these compositions deposited on substrates of any configuration may provide a hydrogen storage film or electrode of any desired shape.

The electrodes taught herein may also comprise structures as described in copending patent application, U.S. Ser. No. b 717,428, entitled "Improved Amorphous Metal Alloy Compositions for Reversible Hydrogen Storage". These improved compositions are characterized in that the compositions disclosed above having the formula $A_aM_bM'_c$ are graded, having a substantial concentration of the A component of the alloy on the active surface to enhance absorption and desorption of the hydrogen, while the remaining components of the alloy, M and M', are disposed in the interior where they function as efficient bulk hydrogen storage materials.

The electrodes according to the present invention may also comprise at least two layers, the outer layer comprising an amorphous metal alloy as taught above having the formula $A_aM_bM'_c$, and the inner layer/layers comprising a known bulk hydrogen storage material which may be crystalline or amorphous or a combination thereof.

These electrodes can be prepared by any of the standard techniques for fabricating such materials. With respect to fabricating amorphous metal alloy electrodes, physical and chemical methods such as electron beam deposition, ion implantation, chemical reduction, thermal decomposition, ion cluster deposition, ion plating, rapid quenching, solid state diffusion, RF and DC sputtering may be utilized to form the compositions herein. One or more methods may be combined advantageously to produce the composite-structure electrodes taught herein.

These electrodes, depending on the M component of the AMM' composition, are characterized by their use in alkaline or acid environments wherein they exhibit high energy density, deep discharge ability, and resistance to degradation as by oxidation.

There are, at the present, relatively few energy storage systems that are based on an acid environment. Lead-acid batteries are representative of one such system. Acid energy storage devices are not numerous since most materials corrode in acidic environments. No known acid energy storage devices have been taught that utilize an amorphous metal alloy as the electrode. Generally, amorphous metal alloys that are known to store hydrogen are not coupled with other necessary properties, such as corrosion resistance to warrant their use in an acid environment. The electrodes described herein utilize amorphous materials that are stable in acid environments, resisting both corrosion and oxidation.

By high energy density is meant the electrodes ability to store a relatively high amount of hydrogen per atom of alloy and also to efficiently store a relatively high amount of electrical charge based on the alloys' weight and volume. Known hydrogen storage electrodes have energy densities on a charge-per-weight basis of about 139 mA-hr/gram for crystalline palladium and about 1668 mA-hr/cm$^3$ on a charge-per-volume basis.

The electrodes described herein have measured energy densities of from about 200 mA-hr/gram to more than about 324 mA-hr/gram on a charge-per-weight basis and from about 1000 mAhr/cm$^3$ to more than about 2430 mA-hr/cm3 on a charge-per-volume basis.

These same electrodes, having high energy densities, can also be fully discharged and recharged without significant degradation of the electrodes' capacity. By fully discharged is meant that the negative electrode can be discharged to the point where oxygen evolution occurs. This contrasts with other hydrogen electrode materials such as LaNi$_5$ and Ni$_{27}$Ti$_{73}$ that cannot be fully discharged without some passivation of the hydrogen storage electrode. Repeated charge/discharge cycles further rapidly passivate electrode materials such as Ni$_{27}$Ti$_{73}$ until they are no longer capable of storing hydrogen. The electrodes taught herein have been deeply discharged and recharged in excess of 450 cycles without showing signs of performance degradation. This compares favorably to commercial battery technology such as Ni-Cd batteries that can be charged and discharged in excess of 500 cycles.

This combination of high energy density coupled with deep discharge ability and resistance to passivation makes these electrodes ideal candidates for use in energy storage devices.

Such an electrochemical device comprises a housing containing a working electrode as described hereinabove, a counter electrode electrically insulated from the working electrode, and an electrolyte in contact with the working electrode and the counter electrode. This energy storage device may be electrochemically charged to store hydrogen in the working electrode and discharged to provide a source of electrons.

If the environment is alkaline, the electrolyte is preferably an aqueous alkaline solution such as KOH and NaOH. Upon charging, the working electrode dissociates hydrogen atoms from water molecules and stores the hydrogen atoms until a discharge of the energy storage device is initiated. If the environment is acidic, the electrolyte is preferably an aqueous acidic solution such as $H_2SO_4$, HCl, $HNO_3$, $H_3PO_4$, acetic acid and mixtures thereof. Upon charging, the working electrode reduces a proton from solution and stores the hydrogen atoms until a discharge of the energy storage device is initiated. Upon initiation, the stored hydrogen is released from the working electrode and allowed to combine with hydroxyl ions in the electrolyte to form water and to provide a supply of electrons.

It is also within the purview of this invention to include a salt compound as the neutral or acid electrolyte or in addition to an acid electrolyte to improve the electrical conductivity of the electrolyte solution. Salts such as $Na_2SO_4$, and NaCl may comprise the electrolyte or may be added to an acid electrolyte, such as the addition of $Na_2SO_4$ to acetic acid.

An energy storage device in accordance with the present invention is depicted in FIG. 1 and identified generally by the reference number 2. This device comprises a housing 4 wherein there are disposed a working electrode 6 and a counter electrode 8, in electrical isolation from each other. The working electrode comprises an electrode in accordance with the teaching of this invention. The counter electrode is any appropriate material suitable for use in the environment of the energy storage device and having a close electrical match to the working electrode. If the device is alkaline in nature, the counter electrode might be a nickel hydroxide electrode. Electrical leads 14 and 16, in electrical contact with the working electrode 6 and the counter electrode 16, respectively, are shown extending above the housing 4 and are available for connection to an electrical load and/or charging source, not shown.

The device 2 contains an alkaline electrolyte 12 in contact with the working electrode 6 and the counter electrode 8. Such alkaline electrolytes may be KOH or NaOH.

FIGS. 2A-D and 3A-D are discussed below in conjunction with the Examples.

EXAMPLES

The following examples demonstrate the hydrogen storage ability of materials in an electrochemical environment. The composition to be tested was disposed in an electrolytic cell as a hydrogen storage electrode. The electrolytic cell also utilized a counter electrode of either NiOH or graphite and an electrolyte of KOH, $H_2SO_4$ or $H_3PO_4$.

Examples 1-5 are controls, utilizing a crystalline palladium electrode in Example 1 and amorphous metal alloy electrode materials not in conformance with the teaching of this invention as the hydrogen storage electrodes in Examples 2-5. Examples 6-20 incorporated a substantially amorphous metal alloy hydrogen storage electrode material as taught herein.

Unless otherwise indicated, the amorphous metal alloys, both controls and those in accordance with the present invention, were prepared via RF sputtering in argon gas. A two-inch research S-gun, manufactured by Sputtered Films, Inc. was employed As is known, DC sputtering can also be employed and achieve similar results. For each of the examples, a titanium substrate was positioned to receive the deposition of the sputtered amorphous alloy. The distance between the target and the substrate in each instance was approximately 10 centimeters. The amorphous alloy composition sputtered onto the titanium substrate ranged from about 0.4 micron to about 1 micron in thickness. The composition of each alloy was verified by x-ray analysis and was also determined to be amorphous by x-ray analysis.

The amorphous metal alloys were then employed as hydrogen storage electrodes in an electrolytic cell, the hydrogen storage electrode having an active surface area of about 1.5cm$^2$. The hydrogen storage electrode material, counter electrode and electrolyte for each example are listed below in Table 1. The hydrogen electrode was cyclically charged at about 1 mA per unit time until the cell voltage stabilized, and then discharged at about 0.1 mA per unit time. The efficiency of the hydrogen electrode for each example was then calculated in terms of the hydrogen to metal ratio (H/Me) and a charge density measured as a charge-per-weight (mA-hr/gm) and a charge-per-volume (mA-hr/cm$^3$). The results of these calculations are also shown in Table 1 below. Unless otherwise noted in Table 1, each composition was cycled at least ten times before the calculations of the H/M ratio and charge density were made.

It is to be noted that the amorphous metal compositions shown in Examples 6-15 are utilized in an alkaline environment and the compositions shown in Examples 16-20 are operated under acid conditions.

TABLE 1

| | HYDROGEN STORAGE ABILITY OF VARIOUS AMORPHOUS METAL COMPOSITIONS | | | | | |
|---|---|---|---|---|---|---|
| Ex. | Composition | Counter Electrode | Electrolyte | Hydrogen-To Metal Ratio (H/Me) | Charge (mA-hr/gm) | Density (mA-hr/cm$^3$) |
| 1 | crystalline Pd | graphite | 2N $H_2SO_4$ | 0.55 | 139 | 1668 |
| 2 | $Ni_{55}Ti_{45}$ | NiOH | 2N KOH | (a) | (a) | (a) |
| 3 | $Ni_{45}Ti_{55}$ | NiOH | 2N KOH | (a) | (a) | (a) |
| 4 | $Ni_{36}Ti_{64}$ | NiOH | 2N KOH | (a) | (a) | (a) |
| 5 | $Ni_{27}Ti_{73}$ | NiOH | 2N KOH | (a) | (a) | (a) |
| 6 | $Pd_5Al_5Ni_{14}Ti_{76}$ | NiOH | 2N KOH | 0.48 | 241(b) | 1301 |
| 7 | $Pd_{10}Ni_{14}Ti_{76}$ | NiOH | 2N KOH | 0.56 | 272(c) | 1597 |
| 8 | $Pd_5Ni_7Ti_{88}$ | NiOH | 2N KOH | 0.38 | 200 | 1036 |
| 9 | $Pd_9Ni_{27}Ti_{64}$ | NiOH | 2N KOH | 0.48 | 231 | 1469 |
| 10 | $Pd_5Ni_{14}Ti_{81}$ | NiOH | 2N KOH | 0.43 | 220 | 1208 |
| 11 | $Pd_5Ni_{25}Mg_{20}Ti_{50}$ | NiOH | 2N KOH | 0.59 | 321 | 1733 |
| 12 | $Pd_{20}Mo_{30}Ti_{50}$ | NiOH | 2N KOH | 0.69 | 254 | 1956 |
| 13 | $Pd_{10}Ni_{20}Zr_{70}$(e) | NiOH | 2N KOH | 0.45 | 140 | 1064 |
| 14 | $Pd_7Ni_{53}Zr_{40}$(e) | NiOH | 2N KOH | 0.53 | 192 | 1566 |
| 15 | $Pt_5Ni_{42}Zr_{37}$(e) | NiOH | 2N KOH | 0.48 | 168 | 1210 |
| 16 | $Pd_{12}Mo_{30}Ti_{58}$ | graphite | 2N $H_2SO_4$ | 1.1 | 444(d) | 3064 |
| 17 | $Pd_{10}W_{30}Ti_{60}$ | graphite | 2N $H_2SO_4$ | 0.79 | 225 | 2160 |
| 18 | $Pd_{10}Fe_{20}Ti_{70}$ | graphite | 2N $H_3PO_4$ | 0.76 | 367 | 2165 |
| 19 | $Pd_2Ni_{18}Ti_{80}$ | graphite | 2N $H_3PO_4$ | 0.64 | 340 | 1836 |
| 20 | $Ag_{10}W_{20}Ti_{70}$ | graphite | 2N $H_2SO_4$ | 0.35 | 123 | 1000 |

(a)-oxidizes in less than about 3 cycles
(b)-after 250 cycles
(c)-after 450 cycles
(d)-after 200 cycles
(e)-melt spun ribbons, powdered to −200 mesh (<50 microns)

The foregoing examples demonstrate the use of the inventive amorphous metal alloy compositions to reversibly store hydrogen. This ability is dramatically shown by contrasting Examples 4 and 9, and Examples 1 and 17.

In Examples 2-5, the hydrogen storage electrode material comprised amorphous Ni-Ti alloys. These amorphous metal alloy compositions are not in accordance with the present invention. Each of these hydrogen electrodes were disposed opposite a nickel hydroxide counter electrode and the electrolyte in the cells comprised 2N KOH. The efficiency of the control amorphous materials could not be measured as the material was severely oxidized after about three cycles, losing effectively all of its ability to retain a charge. Replacing a portion of the nickel component of the composition used in Example 4 with palladium produces an amorphous metal alloy composition in accordance with the present invention, such as $Pd_9Ni_{27}Ti_{64}$ used in Example 9. In this Example, the hydrogen storage electrode was also disposed opposite a nickel hydroxide counter electrode and disposed in an electrolyte of 2N KOH. The efficiency of $Pd_9Ni_{27}Ti_{64}$ as a reversible hydrogen storage material over the course of at least 10 cycles was measured by a hydrogen-to-metal ratio of about 0.48 H/M and a charge density of about 231 mA-hr/gm by weight and about 1469 mA-hr/cm$^3$ by volume with no degradation due to oxidation.

In Example 1 a hydrogen storage electrode control material, crystalline palladium, was used in an electrolytic cell opposite a counter electrode of graphite and an electrolyte of 2N $H_2SO_4$. The efficiency of crystalline palladium was measured by a hydrogen-to-metal ratio of about 0.55 H/Me and a charge density of about 139 mA-hr/gm and 1668 mA-hr/cm3, and the crystalline palladium was seen to exhibit some corrosion. In Example 17, the hydrogen storage electrode material was an amorphous composition of about $Pd_{12}Mo_{30}Ti_{58}$. The counter electrode utilized was graphite and the electrolyte was 2N $H_2SO_4$. The hydrogen storage electrode material did not shown any corrosion throughout the about 200 cycles and demonstrated an efficiency measured by a hydrogen-to-metal ratio of about 1.1 H/Me and a charge density of about 444 mA-hr/gm and 3064 mA-hr/cm3, about 3 times greater charge density per weight than the crystalline palladium control material.

To more clearly demonstrate the combined characteristics of high energy density, deep discharge and resistance to passivation possessed by the electrodes disclosed herein, the charge/discharge characteristics of the electrodes used in Examples 5 and 9 are depicted in FIGS. 2A-D and 3A-D, respectively.

Figure 2A:
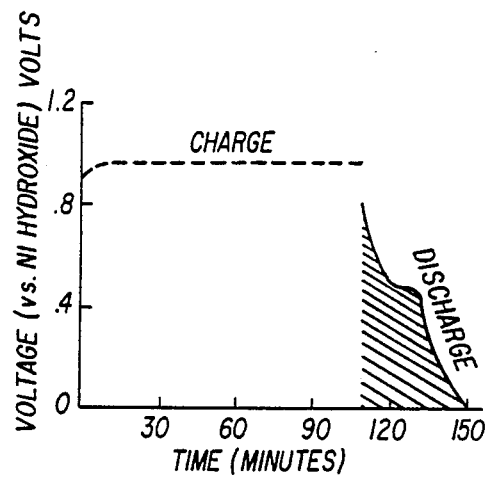
FIG. 2A-D depect charge-discharge curves for various cycles of a known hydrogen storage electrode.
Figure 2B:
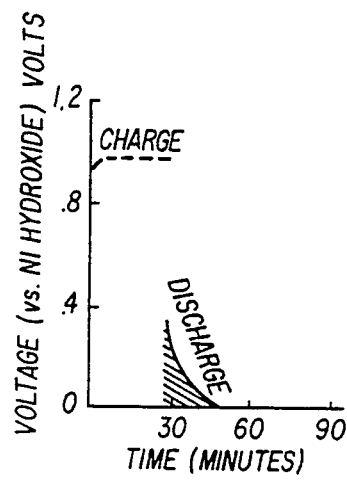
Figure 2C:
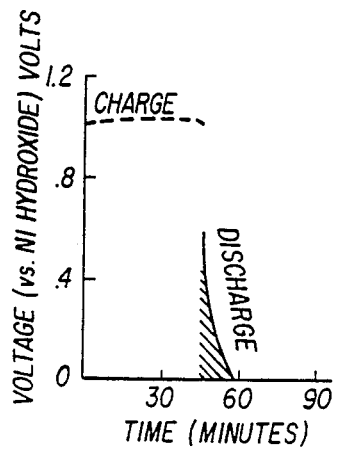
Figure 2D:
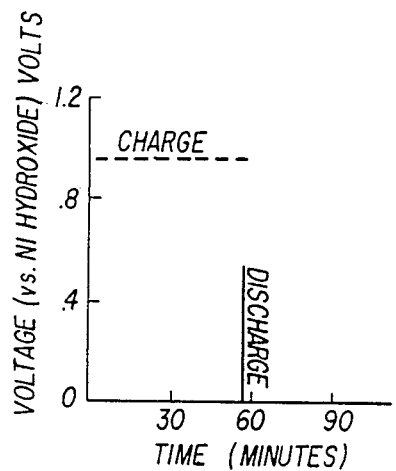

The electrode composition $Ni_{27}Ti_{73}$ used in Example 5 above was reported to have no measurable hydrogen-to-metal ratio or charge density after fewer than 10 charge/discharge cycles. FIG. 2A is the charge/discharge curve for the first cycle of this electrode. It is seen that the electrode was charged at one mA to about one volt (vs. NaOH) and fully discharged at about 0.1 mA over a period of about 40 minutes. In FIG. 2B, the second charge/discharge cycle for this electrode is depicted. The electrode was charged at about 1 mA to about one volt (vs. NaOH), but upon discharge rapidly fell to less than 0.4 volts and was fully discharged in less than 20 minutes. In FIG. 2C, the third cycle for this electrode is shown to have an even more severe discharge curve, and in FIG. 2D it is seen that in the 29th cycle of this electrode, the electrode was unable to maintain any charge.

Figure 3A:
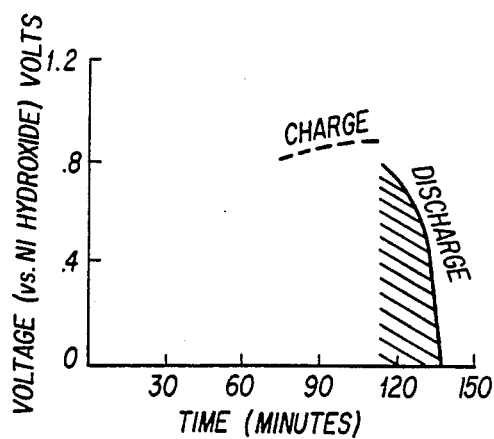
FIGS. 3A-D depict charge-discharge curves for various cycles of a hydrogen storage electrode as taught herein.
Figure 3B:
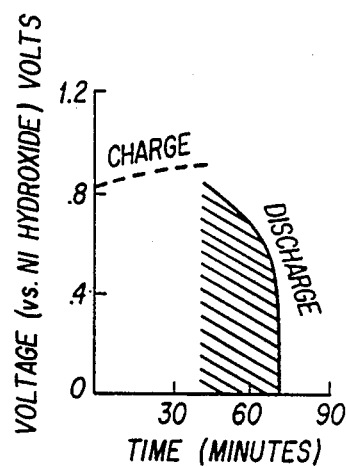
Figure 3C:
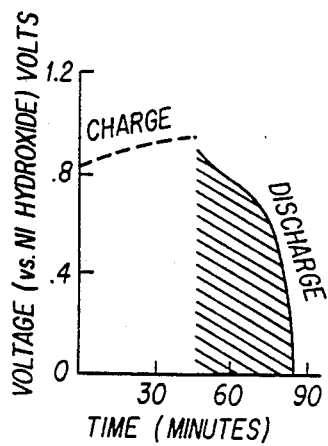
Figure 3D:
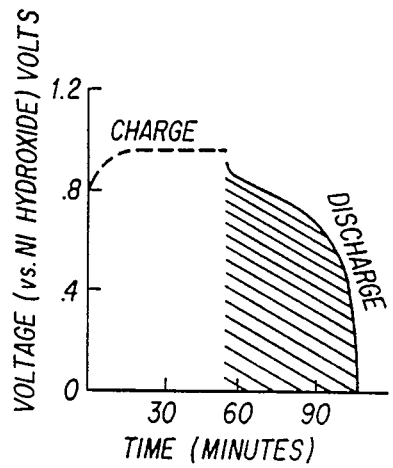

In contrast, an electrode in accordance with the present invention, having an amorphous metal alloy composition of approximately $Pd_9Ni_{27}Ti_{64}$, is depicted in FIGS. 3A-D. In FIG. 3A the first charge/discharge cycle of this electrode is depicted. The electrode was charged at about 1 mA to about 1 volt (vs. NaOH) and showed a uniform discharge curve at about 0.1 mA over a period of about 30 minutes. In FIG. 3B the second cycle of this electrode is shown and it is seen that the electrode was rapidly charged and discharged over an even longer period of discharge time than the first cycle. FIGS. 3C and 3D depict the charge/discharge curves for this electrode during the third and twenty ninth cycles, respectively. It is seen that the electrode continues to charge and discharge with no apparent decrease in energy storage ability.

Although several amorphous metal alloy compositions have been exemplified herein, it will readily be appreciated by those skilled in the art that other amorphous metal alloys and electrodes falling within the scope of the compositions described herein as well-suited for reversibly stored hydrogen could be substituted therefor.

It is to be understood that the foregoing examples have been provided to enable those skilled in the art to have representative examples by which to evaluate the invention and that these examples should not be construed as any limitation on the scope of this invention. Inasmuch as the composition of the amorphous metal alloys employed in the present invention can be varied within the scope of the total specification disclosure, neither the particular A, M or M' components nor the relative amounts of the components in the alloys exemplified herein shall be construed as limitations of the invention.

Furthermore, while these alloys were prepared by a sputtering technique which is a useful means for depositing the alloy onto a metal substrate such as titanium, it is to be understood that neither the process of sputtering nor the coating of substrates are to be construed as limitations of the present invention, in as much as hydrogen storage materials can be prepared and utilized by other processes and in other forms.

The reversible hydrogen storage ability of the amorphous metal alloy compositions and electrodes taught herein provide heretofor unattainable hydrogen storage ability, resistance to oxidation, and stability, and so represent a substantial advancement to hydrogen storage and its anciliary technologies and applications.

Thus, it is believed that any of the variables disclosed herein can readily be determined and controlled without departing from the spirit of the invention herein disclosed and described. Moreover, the scope of the invention shall include all modifications, variations and equivalent embodiments that fall within the scope of the attached claims.

We claim:

1. A reversible hydrogen storage material consisting essentially of an amorphous metal alloy of the formula:

$$A_aM_bM'_c$$

wherein
  A is at least one element selected from the group consisting of Ag, Hg, and Pt;
  M is at least one metal selected from the group consisting of Pb, Cu, Cr, Mo, W, Ni, Al, Co, Fe, Zn, Ru, Cd, and Mn;

M' is at least one element selected from the group consisting of Ca, Mg, Ti, Zr, Hf, Nb, V and Ta; and wherein
a ranges from about 0.005 to about 0.80;
b ranges from about 0.05 to about 0.70; and
c ranges from about 0.08 to about 0.95.

2. The reversible hydrogen storage material in accordance with claim 1 wherein A is Pt.

3. The reversible hydrogen storage material in accordance with claim 1 wherein M is at least one metal selected from the group consisting of Mn, Ru, Fe, Cu, Ni, Cr, Mo, Al, Co and W.

4. The reversible hydrogen storage material in accordance with claim 1 wherein M is at least one metal selected from the group consisting of Ni, Co, and Mo.

5. The reversible hydrogen storage material in accordance with claim 1 wherein M, is Zr, Ti, Ca, Mg or a combination thereof.

6. The reversible hydrogen storage material in accordance with claim 1 wherein a ranges from about 0.05 to about 0.75; b ranges from about 0.1 to about 0.7; and c ranges from about 0.2 to about 0.85.

7. The reversible hydrogen storage material in accordance with claim 1 wherein a ranges from 0.05 to about 0.1; b ranges from about 0.5 to about 0.7; and c ranges from about 0.3 to about 0.8.

8. The reversible hydrogen storage material in accordance with claim 1 wherein said amorphous metal alloy comprises Pt, Ni, and Zr.

9. The reversible hydrogen storage material in accordance with claim 8 wherein said amorphous metal alloy comprises is $Pt_5, Ni_{42}, Zr_{37}$.

10. An electrode for reversibly storing hydrogen comprising essentially of an amorphous metal alloy of the formula:

$$A_aM_bM'_c$$

wherein
A is at least one metal selected from the group consisting of Ag, Hg and Pt;
M is at least one metal selected from the group consisting of Pb, Cu, Cr, Mo, W, Ni, Al, Co, Fe, Zn, Ru, Cd, and Mn;
M' is at least one of the elements selected from the group consisting of Ca, Mg, Ti, Zr, Hf, V, Nb and Ta; and
wherein a ranges from about 0.005 to about 0.80;
b ranges from 0.05 to about 0.70; and
c ranges from about 0.08 to abuot 0.95.

11. The electrode in accordance with claim 10 wherein A is Pt; M is at least one of Mo, Co, Fe, Ni and Mn; and M, is at least one of Zr, Cd and Mg; and wherein said electrode is operable in an alkaline environment.

12. The electrode in accordance with claim 11 wherein M is at least 50% of said alloy.

13. The electrode in accordance with claim 10 wherein said electrode consisting essentially of said amorphous metal alloy disposed on a substrate.

14. The electrode in accordance with claim 13 wherein said substrate is titanium.

15. The electrode in accordance with claim 13 wherein said substrate is tantalum.

16. The electrode in accordance with claim 10 wherein said electrode consisting essentially of a thin film of said amorphous metal alloy.

17. The electrode in accordance with claim 10 wherein said electrode consisting essentially of said amorphous metal alloy disposed in powder form.

18. The electrode in accordance with claim 10 wherein A is Pt; M is at least one of Ru, Pb, Cu, Cr, W and Mo; and M' is at least one of Zr and Nb; and wherein said electrode is operable in an acid or neutral environment.

19. An energy storage device comprising: a working electrode, a counter electrode, electrically isolated from said working electrode; an electrolyte in contact with the working electrode and the counter electrode, and means for collecting electrical current therefrom; the working electrode consisting essentially of an amorphous metal alloy of the formula:

$$A_aM_bM'_c$$

wherein
A is at least one metal selected from the group consisting of Ag, Hg and Pt;
M is at least one metal selected from the group consisting of Pb, Cu, Cr, Mo, W, Ni, Al, Co, Fe, Zn, Ru, Cd and Mn;
M' is at least one of the elements selected from the group consisting of Ca, Mg, Ti, Zr, Hf, V, Nb and Ta; and
wherein
a ranges from about 0.005 to about 0.80;
b ranges from 0.05 to about 0.70; and
c ranges from about 0.08 to about 0.95.

20. The energy storage device in accordance with claim 19 wherein said working electrode is at least fifty percent amorphous.

21. The energy storage device in accordance with claim 19 wherein A is Pt; M is at least one of Mo, Co, Fe, Ni and Mn; and M' is at least one of Zr, Ca and Mg; and wherein said electrolyte is alkaline in nature.

22. The energy storage device in accordance with claim 21 wherein M is at least 50% of said working electrode.

23. The energy storage device in accordance with claim 21 wherein said counter electrode is nickel hydroxide.

24. The energy storage device in accordance with claim 21 wherein said alkaline electrolyte is potassium hydroxide.

25. The energy storage device in accordance with claim 21 wherein said alkaline electrolyte is sodium hydroxide.

26. The energy storage device in accordance with claim 19 wherein said working electrode is fully discharged in operation.

27. The energy storage device in accordance with claim 19 wherein A is Pt; M is at least one of Ru, Pb, Cu, Cr, Mo and W; and M' is at least one of Zr, Nb and Ti; and wherein said electrolyte is acidic in nature.

28. The energy storage device in accordance with claim 27 wherein said counter electrode is graphite.

29. The energy storage device in accordance with claim 27 wherein said counter electrode is Pb-oxide.

30. The energy storage device in accordance with claim 27 wherein said acid electrolyte is selected from the group consisting of $H_2SO_4$, HCl, $HNO_3$, $H_3P0_4$, acetic acid and mixtures thereof.

31. The energy storage device in accordance with claim 27 wherein said acid electrolyte is $H_2S0_4$.

32. The energy storage device in accordance with claim 27 wherein said acid electrolyte is $H_3PO_4$.

* * * * *